United States Patent [19]

Pietrusza et al.

[11] 4,113,413
[45] Sep. 12, 1978

[54] ROTARY SCRAPER IN A ROTARY DRUM ASSEMBLY

[75] Inventors: Arthur Jacob Pietrusza, McMurray; Harry James Kent, Pittsburgh, both of Pa.

[73] Assignee: Dravo Corporation, Pittsburgh, Pa.

[21] Appl. No.: 709,427

[22] Filed: Jul. 28, 1976

[51] Int. Cl.$^2$ .................................... B01J 2/12
[52] U.S. Cl. ........................ 435/222; 23/313 R; 264/117
[58] Field of Search ............... 425/221; 264/117; 23/313 R; 432/106; 308/76

[56] References Cited

U.S. PATENT DOCUMENTS

| | | | |
|---|---|---|---|
| 2,664,173 | 12/1953 | Karig | 308/76 |
| 3,316,585 | 5/1967 | Kallberg | 425/222 X |
| 3,988,114 | 10/1976 | Gorin et al. | 23/313 R |

FOREIGN PATENT DOCUMENTS 2,006,503  8/1971  Fed. Rep. of Germany ........... 425/222

*Primary Examiner*—Francis S. Husar
*Assistant Examiner*—John McQuade
*Attorney, Agent, or Firm*—Stanley J. Price, Jr.; John M. Adams

[57] ABSTRACT

A first cylindrical drum member has an inlet portion for receiving a supply of agglomerative materials, such as preheated coal and char. The first drum member has a longitudinal axis and an outlet portion through which the agglomerated product is discharged into the inlet end portion of a second cylindrical drum member. A second drum member is supported for rotation independently of the first drum member in tandem relation therewith and has a longitudinal axis copolanarly aligned with and intersecting the longitudinal axis of the first drum member. A rotary scraper is rotatably positioned within the first drum member in spaced relation to the inner cylindrical wall thereof and has a longitudinal axis spaced from the longitudinal axis of the first drum member. The scraper has a tubular body portion that is rotatably supported adjacent the inlet and outlet portions of the first drum member. A bearing assembly is supported within the first drum member and rotatably supports the rotary scraper rearward end portion adjacent the outlet portion of the first drum member. The rotary scraper has a plurality of rows of blades extending radially therefrom and upon rotation of the scraper are operable to provide a plurality of spaced elongated ridges and valleys in the layer of agglomerative materials that are deposited on the inner wall of the first drum member to aid in the mixing and agglomeration of the agglomerative materials.

13 Claims, 7 Drawing Figures

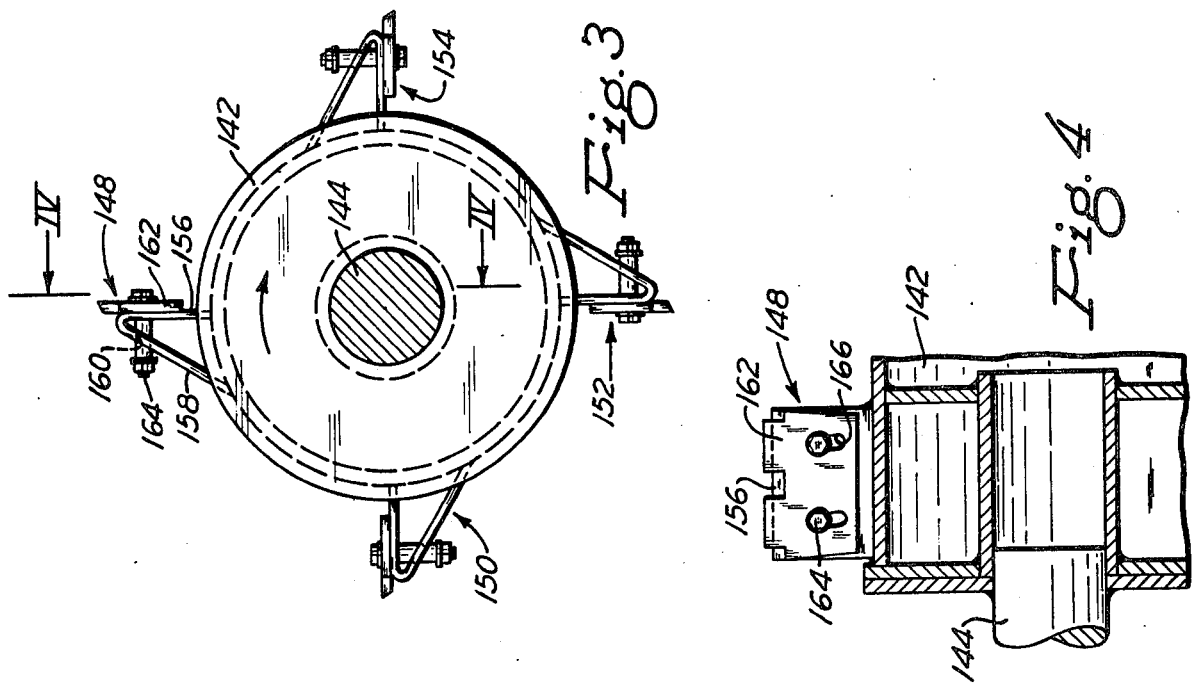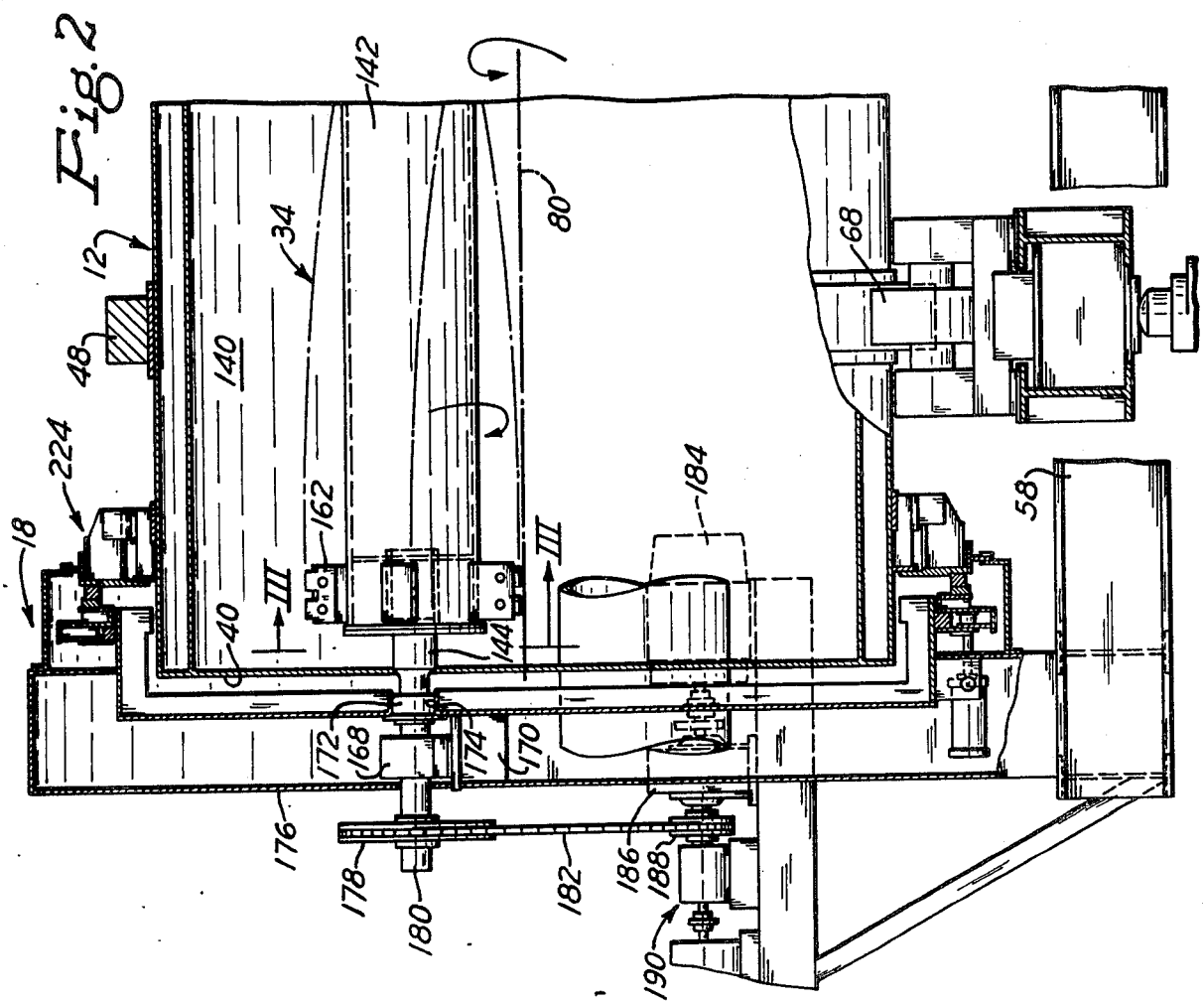

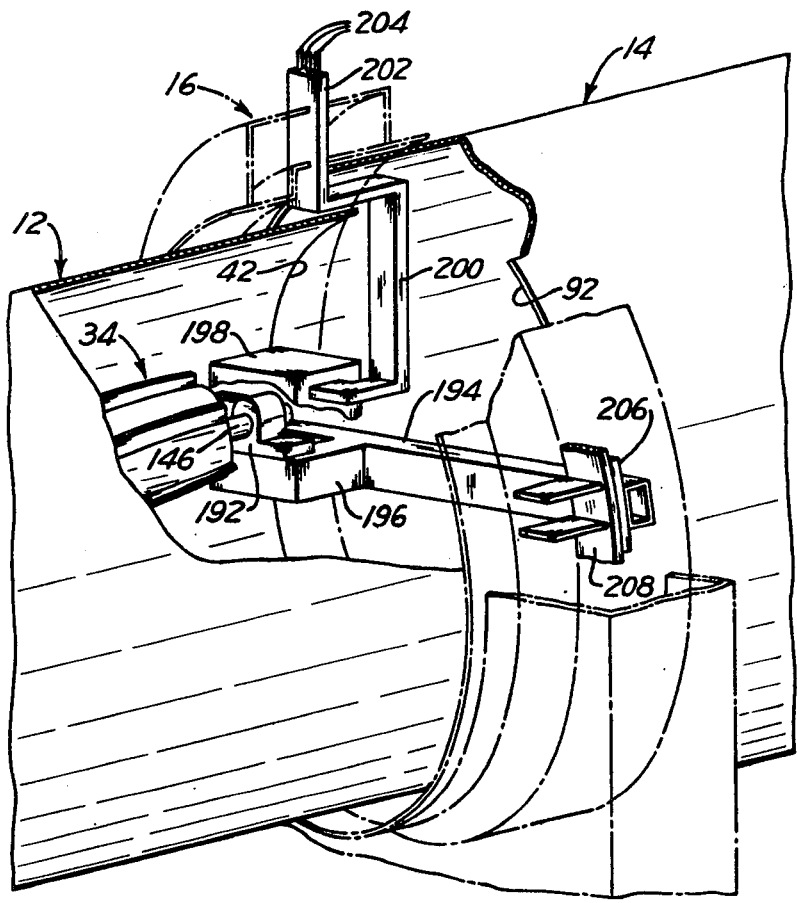
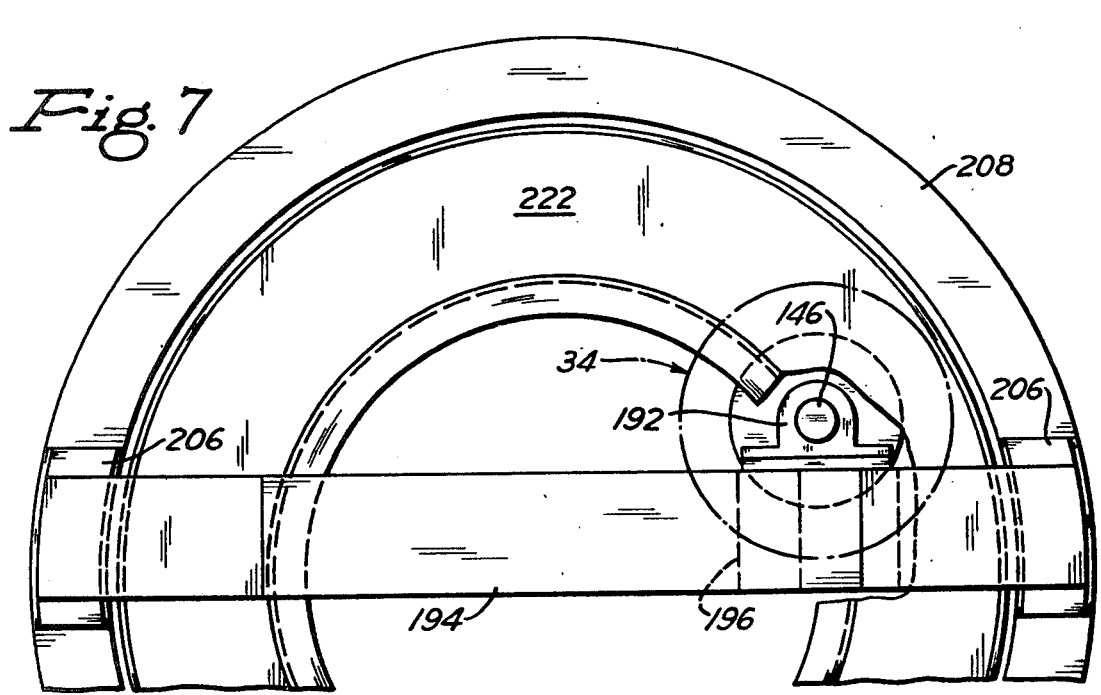

ROTARY SCRAPER IN A ROTARY DRUM ASSEMBLY

BACKGROUND OF THE INVENTION

1. Field of the Invention

This invention relates to a rotary drum assembly for forming an agglomerated product from agglomerative materials and more particularly to a rotary scraper that is supported within a first drum member of a pair of longitudinally aligned drum members to control the thickness and configuration of the layer of agglomerative materials deposited on the inner wall of the first drum member to aid in the mixing and agglomeration of the agglomerative materials.

2. Description of the Prior Art

In the process of distilling coal and forming coke, as described in U.S. Pat. Nos. 3,073,315; 3,401,089 and 3,562,783, particulate bituminous coal and finely divided char (the solid carbonaceous residue of coal which has been distilled at a temperature of between 800° and 1400° F) is introduced into a rotary drum. Depending on the type of coal employed and the ratio of coal to char, pitch may also be added as a binder. The preheated coal and char supply substantially all the heat required to achieve the desired elevated temperature necessary to agglomerate the carbonaceous materials.

The materials are intimately mixed by rotation of the drum. As the constituents are mixed, the coal particles are further heated to such an extent that partial distillation of the coal particles occurs, evolving tar and forming a loosely coherent, plastic sticky mass in the rotary drum. Rotation of the drum mixes the loosely coherent, plastic mass and forms fine plastic particles which grow in size as a result of the tumbling action of the plastic mass of particulate material in the drum. During the mixing or ball forming stage, the rate of flow of the agglomerative materials through the drum, the rotational speed of the drum and the inclination of the drum relative to the horizontal frame are factors in determining the size of the agglomerated product.

Growth of the plastic particles is attained by a snowballing type of tumbling or rolling action on the upper inclined exposed surface of the plastic mass of particulate material in the drum. Repeated tumbling or rolling of the particles cause the continued growth of the plastic particles into agglomerates. The agglomerates will continue to grow until the binder evolved by the coal particles and the pitch binder, if employed, loses its plasticity. Thereafter, the agglomerates in the drum rigidify or harden to form uniformly sized particles that are discharged from the outlet portion of the drum. It is desirable that the agglomerated product formed be uniformly sized, perferably in the range of between ⅜ to 2 inches. Agglomerates having a size greater than about 2 inches and less than about ⅜ inches are considered unacceptable for use in a conventional blast furnace or other conventional metallurgical processes.

Rotation of the drum deposits a layer of the finely divided agglomerative material on the inner surface of the drum. As illustrated in U.S. Pat. No. 3,348,260, a fixed scraper controls the thickness of the layer for coating of the agglomerative materials deposited on the surface of the drum. U.S. Pat. Nos. 2,697,068 and 3,316,585 disclose a rotary scraper positioned within a single rotary drum and operable to continuously remove agglomerative materials from the inner wall of the drum so that a uniform thickness is maintained on the wall of the drum. The rearward end portion of the scraper shaft is supported within the drum. The support arrangement requires a large tubular portion and a spider arrangement located within the drum. The size of the rotary scraper limits the maximum diameter of the drum member. Thus, a drum having a relatively large diameter requires a longer torque arm and consequently a greater moment is applied to the torque arm.

As illustrated in U.S. Pat. No. 2,778,056; 2,695,221 and 1,921,114; British Pat. No. 779,302; Canadian Pat. No. 627,037 and East German Pat. No. 740,613, a single rotary drum includes a rotary scraper for maintaining a layer of agglomerative material of a preselected thickness on the wall of the drum. The scrapers disclosed extend the length of the drums with the scraper shaft end portions supported externally of the rotary drum. As a result, the end portions of the scraper shaft extending through the end portions of the rotary drum must be sealed to prevent the escape of gas and material from the drum end portions and maintain a preselected pressure within the drum, if required.

Additional problems are encountered with supporting the end portions of a rotary scraper within a rotary drum. Specifically, the bearing support for the scraper provides no resistance for the scraping action. The scraper has a tendency to twist out of the way of the agglomerative materials to substantially decrese the effectiveness of the rotary scraper. In addition, because the temperature within the drum member exceeds 850° F, a cooling lubricant must be supplied to the scraper bearing assembly. With the bearing positioned within the drum, the fluid must be pumped through the center tubular portion of the scraper from the feed end through the drum to the discharge end and back. Consequently, the tubular body portion of the scraper must be insulated to insure that the lubricant is sufficiently cool when it reaches the bearing to provide the necessary lubrication.

There is need for a rotary drum assembly in the forming of an agglomerated product from agglomerative materials in which the rotary scraper thereof extends the length of the product forming stage and is rotatably supported within the drum to permit unrestricted relative rotation between the scraper assembly and the rotary drum and is efficiently supplied with coolant fluid to maintain the temperature of the scraper bearings below a preselected temperature.

SUMMARY OF THE INVENTION

In accordance with the present invention, there is provided a rotary drum assembly for forming an agglomerated product from agglomerative materials that includes a first drum member having an inlet portion for receiving the agglomerative materials and an outlet portion for discharging the formed agglomerated product. A second drum member has an inlet portion for receiving the agglomerated product from the first drum member and a discharge end portion for discharging the agglomerated product. The first drum member outlet portion extends into the inlet portion of the second drum member. A rotary scraper having a longitudinal axis is rotatably positioned in the first drum member. The rotary scraper has a front end portion and a rear end portion. Bearing assemblies rotatably support the end portions of the rotary scraper with the rear end portion being rotatably supported within the first drum member adjacent the outlet portion thereof. A drive mechanism rotates the rotary scraper.

The rotary scraper has a tubular body portion with a front shaft secured to and extending forwardly therefrom and a rear shaft secured to or extending rearwardly therefrom. The front shaft extends through a seal in the housing adjacent the inlet portion of the first drum member and is rotatably supported on the housing. The drive mechanism includes a drive motor that is connected through a speed reducer and a drive sprocket on an endless chain to a sprocket nonrotatably secured to the front shaft. In this manner, the scraper is operable to rotate relative to the first drum.

The rotary scraper rear shaft is rotatably supported in substantial parallel relation with the longitudinal axis of the first drum member by a bearing assembly that is positioned within the first drum member adjacent to the outlet portion thereof by a beam member that extends transversely from the rear shaft. The beam member is secured and supported by the center breech within the second drum member beyond the outlet portion of the first drum member. The beam member includes a support portion that is positioned in the first drum member outlet portion, and the bearing assembly is secured to and supported on the beam support portion. A housing extends around the bearing assembbly to insulate the bearing and maintain the bearing assembly in a captured atmosphere. Lubricant is supplied under pressure to the assembly through an insulated conduit system to protect the bearing assembly from elevated temperatures. A purge gas is fed into the bearing housing and serves to protect the bearing assembly from the corrosive atmosphere within the rotary drum assembly and further to maintain the captured atmosphere surrounding the bearing assembly at a preselected temperature.

The rotary scraper has four rows of scraper blade assemblies that are secured to the outer tubular body portion of the scraper. Each blade assembly includes a blade support member with a rearwardly extending leg portion that is secured to the surface of the tube. Separate blade segments are secured to the blade supports, and elongated slots in the blade segments permit radial adjustment of the blade segments on the blade supports. The rows of blade assemblies extend lengthwise along the tube to form elongated continuous cutting surfaces along substantially the entire length of the scraper. The scraper blades provide symmetrical ridges and valleys in the layer of agglomerative material deposited on the first drum member inner wall to aid in the mixing and agglomeration of the agglomerative materials.

Accordingly, the principal object of the present invention is to provide a rotary drum assembly having a pair of drum members with a rotary scraper assembly supported within the first drum member and arranged to rotate to aid in the mixing and agglomeration of the agglomerative material therein.

Another object of the present invention is to provide a rotary drum assembly that includes a first drum member for forming an agglomerated product and a second drum member for hardening the agglomerated product with a rotary scraper assembly extending the length of and rotatably supported within the first drum member for controlling the mixing and agglomeration of the agglomerative materials.

BRIEF DESCRIPTION OF THE DRAWINGS

FIG. 2 is a partially sectional view in side elevation of the balling drum feed end, illustrating the seal means for the feed end of the balling drum and the manner in which one end of the rotary scraper is rotatably mounted and driven.

FIG. 3 is a partially sectional view in elevation taken along the line III—III of FIG. 2, illustrating the blade configuration of the rotary scraper.

FIG. 4 is a view in section taken along the line IV—IV of FIG. 3, illustrating in detail the manner in which the scraper blades are adjustably secured to the rotary scraper body portion.

FIG. 5 is a fragmentary perspective view of the balling drum discharge portion, illustrating the support means for the opposite end of the rotary scraper.

FIG. 7 is a view taken along the line VII—VII of FIG. 6, illustrating the transverse beam supporting the end portion of the rotary scraper.

DESCRIPTION OF THE PREFERRED EMBODIMENT

Figure 1:
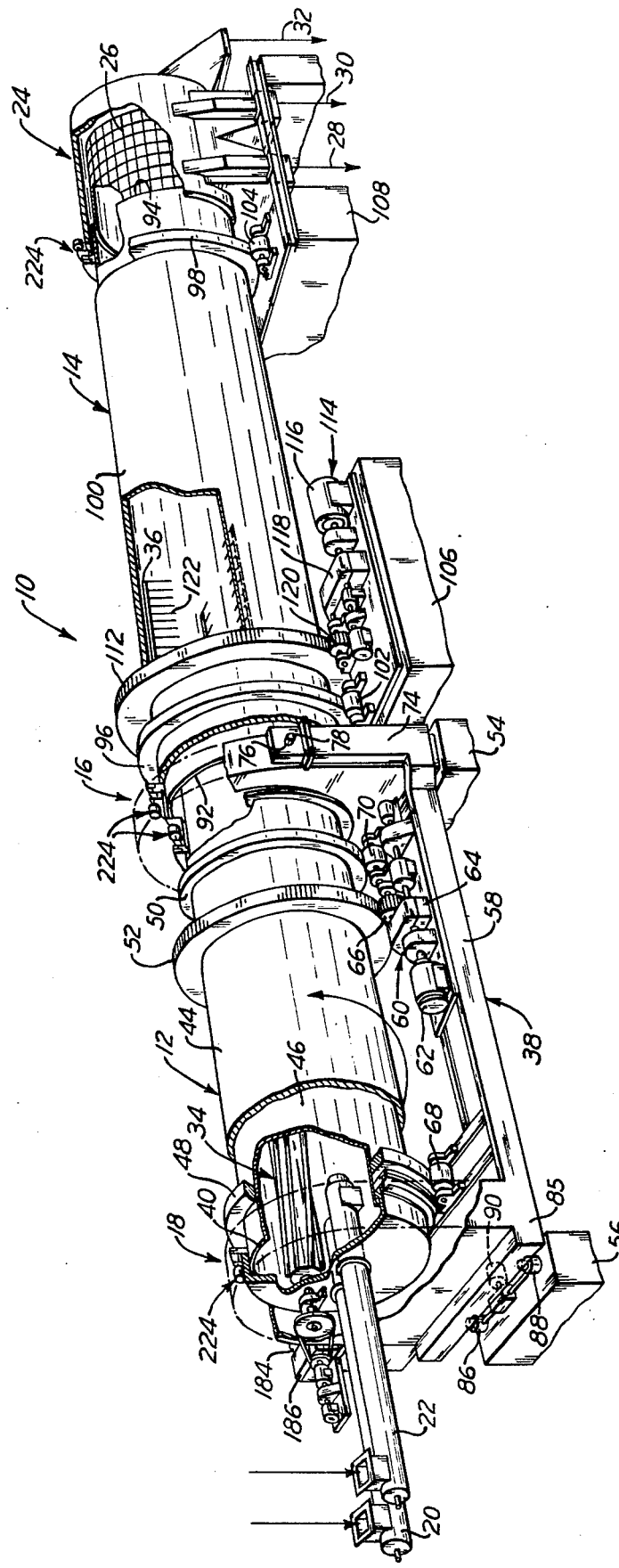
FIG. 1 is a perspective view of the rotary drum assembly that includes separate balling and hardening drums with portions broken away to illustrate the mechanical seal between the respective drums, the rotary scraper in the balling drum, the rakes in the hardening drum and the integral trommel screen.

Referring to the drawings and particularly FIG. 1, the rotary drum assembly generally designated by the numeral 10 includes a balling drum 12 and a hardening drum 14. The balling drum 12 is longitudinally aligned in tandem relation with the hardening drum 14 and the balling drum 12 has its discharge portion extending into the inlet portion of the hardening drum. A center breech assembly 16 extends around the discharge end portion of the balling drum 12 and the inlet end of hardening drum 14 and has a suitable seal assembly 224 for sealing the respective drums to maintain a positive pressure within the drum assembly 10. A feed end breech assembly 18 surrounds the feed end of the balling drum 12 and also has a suitable seal assembly 224 to maintain the positive pressure within the drum assembly 10.

A pair of feed screw conveyors 20 and 22 extend through suitable seals in the feed end breech 18 and are arranged to supply agglomerative materials, such as coal and char, to the inner portion of the balling drum 12. The discharge end of the hardening drum 14 extends into a discharge end breech assembly 24 which also has suitable seal means 224 to provide positive pressure within the drum assembly 10. A trommel screen 26 is secured to the discharge end of the hardening drum 14 and is positioned within the discharge breech assembly 24. The discharge breech assembly 24 has a plurality of outlets 28, 30 and 32 for the material agglomerated in the drum assembly 10. The agglomerated product having the desired size consist is arranged to be discharged from the drum assembly 10 through outlets 28 and 30 and the oversized product is discharged through outlet 32.

A rotary scraper assembly generally designated by the numeral 34 is supported within the balling drum 12 and is arranged to control the thickness of the agglomerative materials deposited on the inner wall of the balling drum 12 and, as described in co-pending application, Ser. No. 627,689, entitled "Method And Apparatus For Agglomerating Finely Divided Agglomerative Materials In A Rotating Drum", provide ridges and valleys within the balling drum 12 to aid in the mixing and agglomeration of the agglomerative materials within balling drum 12. The instant application and copending application Ser. No. 627,689 are assigned to a common assignee.

Positioned within hardening drum 14 are a plurality of rakes 36 that extend radially therein and are arranged to assist in controlling the size consist of the agglomerated material that is rigidified within the hardening drum 14. Suitable drive means, later described, rotate the balling drum 12 and hardening drum 14 at different peripheral speeds and rotate the rotary scraper assembly 34 at a preselected speed and preferably in timed relation with the balling drum 12.

The balling drum 12 is supported on a platform assembly generally designated by the numeral 38 that is pivotally secured at one end to the center breech assembly 16. The platform assembly 38 is arranged to change the angle of inclination of the balling drum 12 to thereby control the rate of flow of the agglomerative materials through the balling drum 12. The balling and hardening drums 12 and 14 are so arranged that their longitudinal axes intersect at a location coincident with the pivot axis of the platform assembly 38 so that the platform pivots the balling drum 12 at the intersection of the balling drum and hardening drum axes.

With the above arrangement agglomerative materials as, for example, particulate coal and finely divided char, previously heated to an elevated temperature is introduced through the conveyors 20 and 22 into the balling drum assembly 12. The preheated coal and char are arranged to supply as sensible heat substantially all of the heat required to achieve the desired temperature for agglomerating the carbonaceous materials. An inert atmosphere is maintained within the drum assembly 10, and a positive pressure of between one and three inches water is maintained within the drum assembly 10 by means of the seals provided at the breech assemblies 16, 18 and 24.

The balling drum 12 is rotated at a preselected speed to effect intimate mixing of the constituents and tumbling of the agglomerates as they are formed in the balling drum 12. As the constituents are admixed in the balling drum, the coal particles are further heated to an extent that partial distillation of the coal particles occurs evolving tar and forming a loosely coherent, plastic sticky mass in the balling drum 12. Where desired, a pitch binder may also be supplied to the balling drum 12 to further contribute to the agglomeration of the carbonaceous material within the balling drum. The loosely coherent, plastic mass formed in the balling drum 12 breaks up during tumbling into relatively fine plastic particles. Growth of the plastic particles within the balling drum 12 is attained by a snowballing type of tumbling or rolling action on the upper exposed surface of the plastic mass of particulate material in the balling drum 12.

A portion of the plastic mass is deposited on the inner wall of the balling drum 12 and the rotary scraper controls the thickness and configuration of the layer of the plastic mass so deposited and further forms ridges and valleys in the deposited material to improve the mixing and tumbling of the particles as they agglomerate.

The agglomerates so formed within the balling drum 12 continue to grow until the binder evolved by the coal particles and pitch, if employed, loses its plasticity. The agglomerates so formed are conveyed by the rotation of the balling drum 12 over an annular dam 222 adjacent the balling drum outlet or discharge end portion; into the hardening drum 14. In the hardening drum 14 the remaining binder is evolved from the agglomerates, and the agglomerates rigidify in the hardening drum 14 as substantially uniformly sized agglomerates. A receiver 220 is connected to the center breech 16 and is arranged to receive the agglomerates and particulate material discharged from the balling drum 12 and not transferred to the hardening drum 14.

The rotation of the hardening drum 14 conveys the rigidified agglomerates to the trommel screen 26 where agglomerates of a preselected size are discharged through the openings in the trommel screen and through outlets 28 and 30. The oversized agglomerates that do not pass through the openings in the trommel screen 26 are discharged through the opening 32. The oversized agglomerates may be crushed and recycled as a constituent of the feed introduced into the balling drum 12. The product of the preselected size recovered through outlets 28 and 30 is thereafter calcined in a calcining vessel at an elevated temperature of between 1500° F and 1800° F to form a formcoke that has strength and abrasion resistance that is equal or superior to that of conventional blast furnace coke.

The balling drum 12 has a generally cylindrical configuration with an inlet end portion 40 and an outlet end portion 42 (FIGS. 1, 2, 5 and 6). A suitable insulation material 44 may be positioned on the outer surface of the drum body portion 46 to reduce heat loss through the wall of the balling drum 12 during the agglomeration process. The balling drum 12 has a pair of steel tires or riding rings 48 and 50 adjacent the inlet end portion 40 and the discharge end portion 42. A drive ring gear 52 is secured to the outer surface of the balling drum 12 between the rings 48 and 50.

Figure 6:
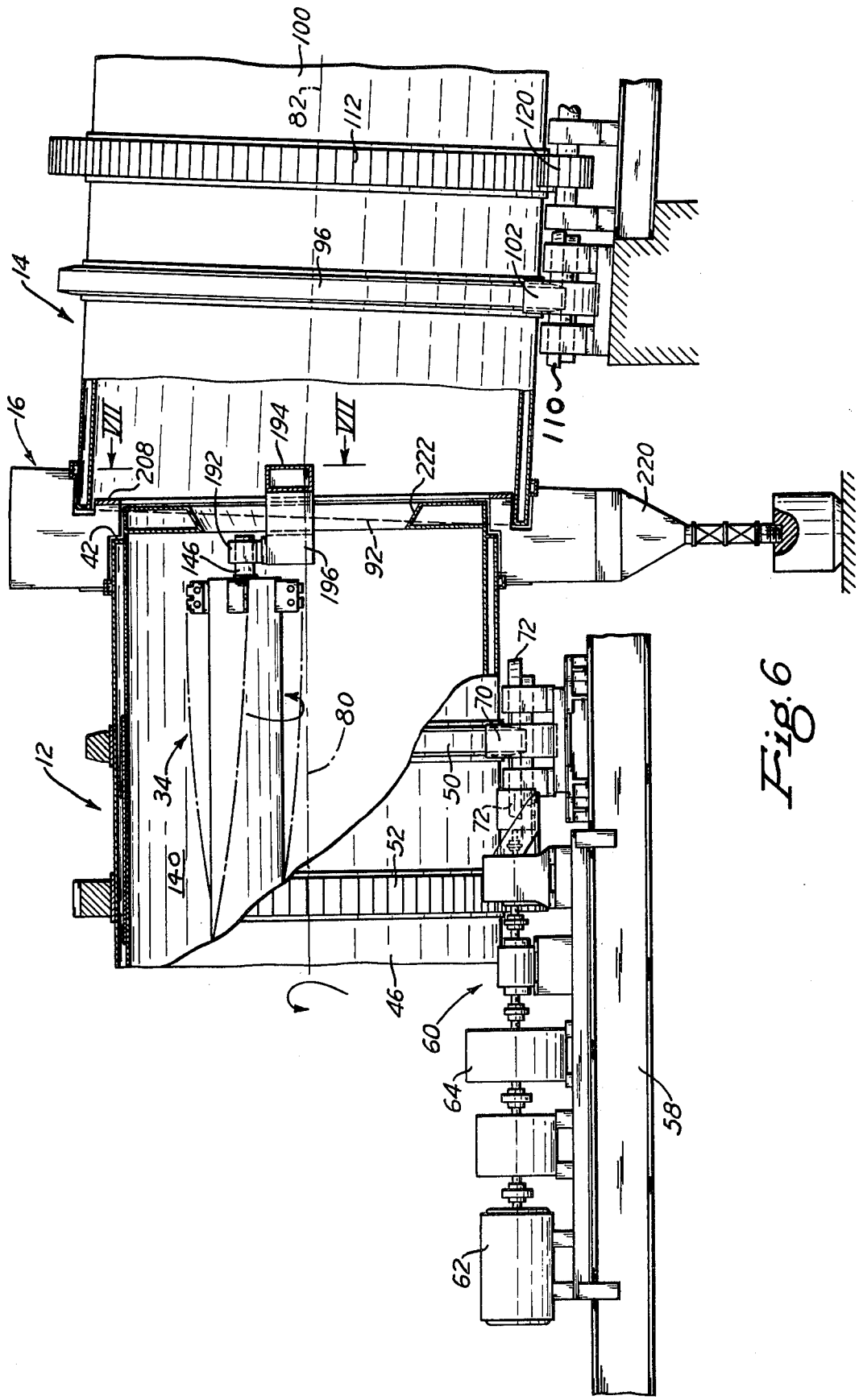
FIG. 6 is a fragmentary view in side elevation of the balling drum discharge end and the hardening drum inlet portion, illustrating the manner in which the opposite end portion of the rotary scraper is supported within the balling drum.

The center breech assembly 16 is supported on a fixed pad 54 and the front end of the platform 38 is supported on a second fixed pad 56. The platform assembly 38 includes a frame member 58 positioned beneath the balling drum 12. Mounted on the frame member 58 is a separate balling drum drive assembly generally designated by the numeral 60 that includes a drive motor 62, a reducer 64 and a pinion gear 66 that meshes with the drive ring gear 52. The riding rings 48 and 50 are supported on pairs of trunnion rollers 68 and 70 with suitable thrust wheels 72 abutting the sides of the ring 50, as illustrated in FIG. 6.

The platform assembly frame member 58 has a pair of upstanding leg portions 74, one of which is illustrated in FIG. 1. The upstanding leg portions have bores 76 therethrough adjacent the upper end portion. The center breech assembly 16 has a pair of trunnion shafts 78 extending outwardly therefrom through the bores 76 in frame member leg portions 74 to thus support that portion of the frame member 58 adjacent the balling drum discharge end portion 42. As is illustrated in FIG. 6, the longitudinal axis 80 of balling drum 12 intersects the longitudinal axis 82 of the hardening drum 14 at the transverse axis formed by the trunnion shafts 78 so that the balling drum support platform 38 pivots about the intersection of the axes 80 and 82.

The frame 58 has a front end portion 85 which is mounted on a plurality of jack devices 86 and 88. The jack devices 86 and 88 are supported on pad 56 and are arranged to be driven by a motor 90 to raise and lower the frame front end portion 85 and thus pivot the frame about the trunnion shafts 78 and adjust the slope of balling drum 12 relative to the hardening drum 14.

The hardening drum 14 has a generally cylindrical configuration with an inlet end portion 92 and an outlet end portion 94. Although not illustrated in FIG. 1, the hardening drum body portion 100 has a suitable layer of insulation material secured thereto to reduce heat transfer therethrough during the agglomeration process. A pair of steel tires or annular rings 96 and 98 are secured to the hardening drum body portion 100 adjacent the inlet and outlet end portions. Pairs of trunnion rollers 102 and 104 are supported on fixed pads 106 and 108 and rotatably support the hardening drum 14. Thrust wheels 110 maintain the ring 96 in operative position on the trunnion rollers 102, as illustrated in FIG. 6. The platforms 106 and 108 are so constructed to provide the desired angle of inclination for the hardening drum 14.

The hardening drum body portion 100 has a ring gear 112 secured thereto adjacent the ring 96. A hardening drum drive assembly generally designated by the numeral 114 is supported on the pad 106 and includes a motor 116, a reducer 118 and a pinion gear 120 meshing with the ring gear 112. With this arrangement, the hardening drum 14 may be rotated at a preselected speed that is independent of the speed of rotation of the balling drum 12. Secured to the inner wall of hardening drum body portion 100 are a plurality of rakes 36 that have inwardly extending tines 122. The rakes 36 extend longitudinally throughout a portion of the hardening drum 14 and are arranged as described in U.S. Pat. No. 3,628,012 and U.S. Pat. 3,460,195 to control the size consist of the agglomerates during the hardening process and before the agglomerates have rigidified.

The rotary scraper 34 is rotatably positioned within the balling drum 12 and the support for the front end of the rotary scraper is illustrated in FIG. 2. The support for the rear end of the rotary scraper 34 adjacent the balling drum discharge end portion 42 is illustrated in FIGS. 5, 6 and 7.

The rotary scraper 34 is rotatably positioned within the balling drum 12 in spaced relation to the drum inner wall 140 and is preferably located above a horizontal plane extending through the balling drum axis 80 and on the left side of a vertical plane extending through the balling drum axis 80. With this arrangement, the rotary scraper 34 is positioned in the upper left quadrant of the cylindrical opening in the balling drum 12. The position of the rotary scraper 34 is determined by the direction of drum rotation so that the scraper is positioned in a quadrant opposite to that of the inclined bed of agglomerative materials.

The rotary scraper 34 has a tubular body portion 142 with a front shaft 144 secured thereto and extending forwardly therefrom (FIG. 2) and a rear shaft 146 secured thereto and extending rearwardly therefrom (FIGS. 5-7). As illustrated in FIGS. 3 and 4, the scraper 34 has four rows of scraper blade assemblies generally designated by the numerals 148, 150, 152 and 154 secured to the outer surface of the tube 142. Each of the blade assemblies includes a blade support member 156 with a rearwardly extending leg portion 158. The support member 156 and leg portion 158 have apertures 160 therethrough. The blade support members 156 and the rearwardly extending leg portions 158 are rigidly secured to the surface of the tube 142 as by welding or the like. Separate blade segments 162 are secured to the blade support members 156 by means of bolts 164 extending through the aligned apertures 160 and the elongated slots 166 in the blade segments 162. The slots 166 in the blade segments 162 permit radial adjustment of the blade segments 162 on the blade supports 156.

By providing a plurality of adjustable blade segments, a preselected number of scraper blade assemblies may be utilized to control the thickness of the agglomerative materials deposited on the inner wall of the balling drum 12. The assemblies can be easily replaced and substituted for others to reduce the dead load of the scraper assembly 34 and the wear on the drive mechanism and bearings therefor. The rows of blade assemblies 148-154 extend lengthwise along the tube 142 to form elongated continuous cutting surfaces along substantially the entire length of the scraper 34. The blade segments are equidistantly positioned on the periphery of the scraper tube 142 to provide symmetrical ridges and valleys in the layer of agglomerative materials deposited on the balling drum inner wall 140. The continuous cutting surface formed by the rows of blade segments 162 follow a helical path as diagrammatically illustrated by the — . — line in FIG. 2. The blade segments 162 may be arranged in a preselected helical configuration or arranged parallel to the longitudinal axis of the scraper tube 142. With this arrangement, the rotary scraper 34 forms ridges and valleys in a layer of agglomerative materials deposited on the inner wall 140 of balling drum 12 in which the ridges serve as lifters to admix the agglomerative constituents and aid in forming agglomerates of a preselected size range from the agglomerative materials.

As illustrated in FIG. 2, the rotary scraper front shaft 144 is rotatably supported in a pillow block bearing 168 that is mounted on a structural member 170 and extends through a suitable seal 172 positioned in an aperture 174 of a housing 176. The housing 176 surrounds the balling drum feed end breech 18. The structural member 170 is secured to the housing 176. A sprocket 178 is nonrotatably secured to the shaft end portion 180 of front shaft 144 that projects through the housing 176.

The drive mechanism for rotating the scraper 34 includes an endless chain 182 that is reeved about the sprocket 178 and is drivingly connected to a motor 184 through a suitable speed reducer 186, and a drive sprocket 18 is nonrotatably connected to the drive shaft of the reducer 186. Thus, the scraper 34 is arranged to rotate preferably in a direction opposite to the direction of rotating of the balling drum 12 as indicated by the directional arrow. A suitable overdrive clutch mechanism is provided for auxiliary drive of the scraper.

As illustrated in FIGS. 5, 6 and 7, the rotary scraper rear shaft 146 is supported in a pillow block bearing 192 within the balling drum 12 adjacent the balling drum discharge end portion 42. The pillow block bearing 192 is supported by a transverse beam member 194 that is positioned within the hardening drum 14 beyond the balling drum outlet end portion 42 and is secured to and supported by the center breech 16. It should be noted that the outer diameter of the balling drum 12 is smaller than the inner diameter of the hardening drum 14 so that the discharge end portion 42 of balling drum 12 extends into and beyond the inlet end portion 92 of hardening drum 14. This arrangement facilitates the transfer of agglomerated particles from the balling drum 12 to the hardening drum 14 with a minimum of breakage of the fragile particles.

The transverse beam member 194 has a forwardly extending portion 196 that extends into the rear discharge portion of balling drum 12 and the pillow block bearing 192 is secured to and supported on the forwardly extending portion 196. A housing 198 extends around the pillow block bearing 192 to insulate the bearing 192 and maintain the bearing in a captured atmosphere. Purge gas at a preselected temperature and pressure is fed into the housing 198 and serves to maintain a positive pressure within the housing 198. This insulates the bearing 192 from the corrosive atmosphere of the rotary drum assembly. In addition continuous purging of gas into the housing 198 maintains the temperature of the captured atmosphere therein within a preselected range. A conduit 200 is connected to an opening in the housing 198 and extends between the outlet end portion of balling drum 12 and the inlet end portion 92 of hardening drum 14 and has a portion 202 that extends through the housing of the center breech 16. A plurality of insulated service lines 204 extend through the conduit 200 to the housing 198 and supply lubricant under pressure to the pillow block bearing 192 and a coolant fluid to maintain the temperature of the bearing below a preselected temperature. Lubricant is also supplied to bearing 192 through the rotary scraper shaft 146.

The transverse member 194 is secured to and supported by the center breech 16 as is illustrated in FIGS. 5, 6 and 7. The transverse beam member 194 has a generally rectangular configuration and has a pair of arcuate pads 206 (FIG. 5) secured to an annular ring member 208 that forms a part of the center breech 16 and is illustrated in FIGS. 6 and 7. The ring member remains fixed with the center breech 16 and supports the transverse member 194. The ring member 208 has an outside diameter smaller than the inner diameter of the hardening drum 14 and extends within the hardening drum 14 at the inlet end portion 92. With this arrangement, the rear bearing 192 is supported within the balling drum 12.

With the above described apparatus, finely divided carbonaceous materials are agglomerated at an elevated temperature and to form a substantial quantity of agglomerates having a preselected size range. The carbonaceous materials at an elevated temperature are introduced into the rotating drum 12, and a layer of carbonaceous material is deposited on the inner cylindrical wall 140. A plurality of spaced ridges and valleys are formed in the layer of carbonaceous material with the ridges and valleys extending lengthwise along the inner wall 140. After the binder in the carbonaceous particles is evolved, the layer of carbonaceous material loses its plasticity and rigidifies to form a relatively rigid layer with ridges and valleys formed therein.

As other finely divided carbonaceous material is introduced into the balling drum 12, the carbonaceous material forms a bed in the drum with an upper surface extending upwardly in the direction of rotation of the drum. The ridges of carbonaceous material formed on the inner wall serve as lifters to convey or lift a portion of the finely divided carbonaceous material adjacent the drum inner wall 140 in the direction of drum rotation and deposit at least a portion of this carbonaceous material on the uper surface of the bed to both intimately mix the finely divided carbonaceous material in the drum and deposit particles on the upper inclined surface of the bed. Repeated tumbling of the particles and partially formed agglomerates on the upper surface of the bed causes continued growth to form agglomerates having a preselected size range. Any finely divided carbonaceous material deposited on the exposed surface of the ridges and valleys is continually removed therefrom so that the ridges and valleys of a preselected configuration are maintained during the agglomeration process.

In this manner, a plurality of spaced elongated ridges are formed on the inner wall of the balling drum 12 to serve as lifting or mixing devices for the finely divided carbonaceous material. The scraper 34 positioned in the drum 12 initially shapes the elongated ridges and valleys in the layer of carbonaceous material and further removes other agglomerative carbonaceous material that may be deposited on the surface of the ridges and valleys so that the layer of carbonaceous material retains its ridge and valley configuration during the agglomeration process.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A rotary drum assembly for forming an agglomerated product from agglomerative materials comprising,
    a first drum member having an inlet portion for receiving the agglomerative material and a discharge end portion for discharging the formed agglomerated product,
    a second drum member having an inlet portion for receiving the agglomerated product from said first drum member and a discharge end portion for discharging the agglomerated product,
    means for rotating said first drum member and said second drum member,
    said first drum member discharge end portion extending into said inlet portion of said second drum member,
    a rotary scraper having a longitudinal axis rotatably positioned in said first drum member,
    said rotary scraper having a front end portion and a rear end portion, said rear end portion positioned in said first drum member,
    first means for rotatably supporting said front end portion of said rotary scraper,
    second means for rotatably supporting said rotary scraper rear end portion within said first drum member, and
    means for rotating said rotary scraper.

2. A rotary drum assembly as set forth in claim 1 which includes,
    said first drum member having a longitudinal axis and an inner cylindrical wall,
    said rotary scraper being positioned within said first drum member and adjacent to said inner cylindrical wall with said scraper longitudinal axis spaced from said longitudinal axis of said first drum member.

3. A rotary drum assembly as set forth in claim 1 which includes,
    said rotary scraper having a body portion with a front shaft extending forwardly therefrom and a rear shaft extending rearwardly therefrom,
    said plurality of scraper blade assemblies secured to and extending radially outwardly from the outer surface of said body portion, and
    said scraper blade assemblies each having radially adjustable blade segments extending lengthwise along said body portion to form elongated continuous cutting surfaces substantially the entire length of said rotary scraper, said front shaft extending through the inlet portion of said first drum member.

4. A rotary drum assembly as set forth in claim 3 which includes,
   means for radially adjusting said blade segments on said body portion.

5. A rotary drum assembly as set forth in claim 4 which includes,
   said blade segments having an elongated slot therein,
   blade supports rigidly secured to said body portion, said blade supports each having an aperture therein, and
   bolt means extending through said blade support apertures and said blade segment slots aligned therewith for supporting said blade segments on said blade supports for radial movement toward and away from the surface of said body portion.

6. A rotary drum assembly as set forth in claim 1 which includes,
   said rotary scraper having a front shaft and a rear shaft,
   connecting means for drivingly connecting said front shaft to said means for rotating said rotary scraper,
   bearing means positioned within said first drum member for rotatably supporting said rear shaft within said first drum member adjacent said discharge end portion thereof, and
   means positioned within said second drum member for supporting said bearing means.

7. A rotary drum assembly as set forth in claim 1 which includes,
   a center breech assembly extending around said discharge end portion of said first drum member and said inlet portion of said second drum member,
   a beam member secured to said center breech assembly within said second drum member adjacent to said first drum member discharge end portion and extending transversely relative thereto,
   said beam member having a forwardly extending portion positioned in said first drum member discharge end portion, and
   bearing means secured to and supported on said beam member forwardly extending portion within said first drum member for rotatably supporting said rotary scraper rear end portion.

8. A rotary drum assembly as set forth in claim 7 in which includes,
   a housing surrounding said bearing means for rotatably supporting said rear end portion,
   an opening within said housing, and
   conduit means passing through said center breech assembly between said first drum member discharge end portion and said second drum member inlet portion into said housing opening for supplying a lubricant under pressure to said bearing means to maintain the temperature of said bearing means below a preselected temperature.

9. A rotary drum assembly as set forth in claim 1 which includes,
   a center breech assembly surrounding said discharge end portion of said first drum member and said inlet portion of said second drum member,
   a beam member positioned transversely within said center breech assembly beyond said first drum member discharge end portion and having opposite end portions,
   means for securing said beam member end portions to said center breech assembly, and
   bearing means secured to and supported on said beam member within said first drum member for rotatably supporting said scraper rear end portion.

10. A rotary drum assembly as set forth in claim 9 in which,
    said means for securing said beam member opposite end portions to said center breech assembly includes an annular ring portion secured to said center breech assembly,
    said annular ring portion having an outside diameter less than the internal diameter of said second drum member,
    said annular ring portion positioned within said second drum member inlet portion in nonrotatable relation thereto, and
    said beam member secured at its opposite end portion to said annular ring portion.

11. A rotary drum assembly as set forth in claim 1 which includes,
    said rotary scraper having a front shaft portion and a rear shaft portion,
    a feed end breech assembly surrounding said inlet portion of said first drum member to provide a fluid-tight seal around said first drum member inlet portion,
    said front shaft portion being rotatably supported within said feed end breech assembly, and
    bearing means for rotatably supporting said rear shaft portion within said first drum member adjacent said first drum member discharge end portion.

12. A rotary drum assembly as set forth in claim 11 which includes,
    a housing surrounding said feed end breech assembly, said housing having an aperture extending therethrough,
    an aperture in said feed end breech assembly aligned with said housing aperture,
    said front shaft portion extending through said aligned apertures,
    means for sealing said front shaft portion within said feed end breech assembly aperture, and
    bearing means for rotatably supporting said front shaft portion externally of said feed end breech assembly, said bearing means mounted on said housing.

13. A rotary drum assembly as set forth in claim 12 which includes,
    a drive motor mounted on said housing adjacent said front shaft portion, and
    means drivingly connecting said drive motor to said front shaft portion for rotating said rotary scraper in a preselected direction relative to the direction of rotation of said first drum member at a preselected speed in timed relation therewith.

* * * * *